Dec. 1, 1931.                L. C. HARDESTY                1,834,777
                              MOTOR CONTROL
                             Filed Aug. 5, 1927
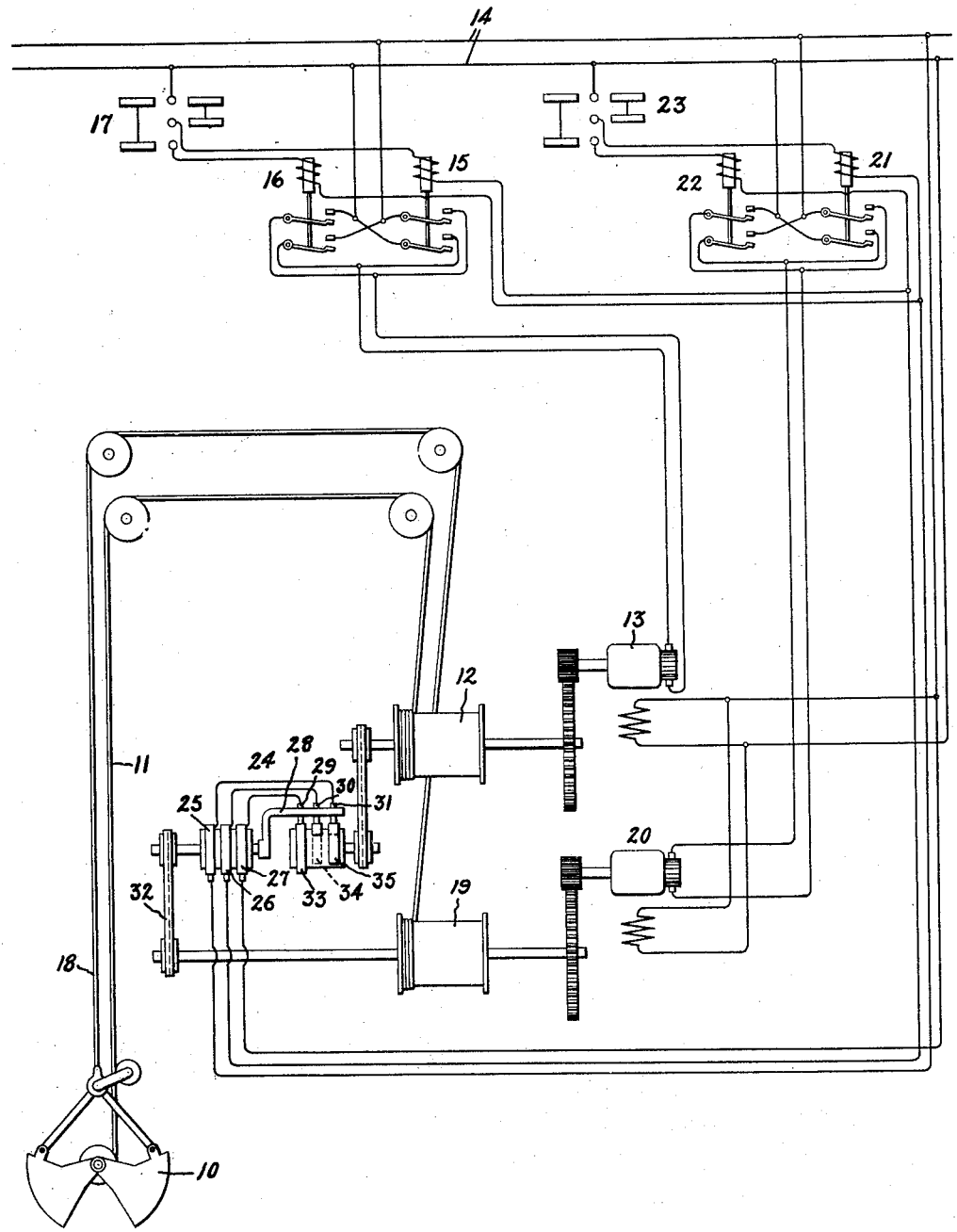
Inventor:
Llewellyn C. Hardesty
by Alexander S. Lenz
His Attorney Patented Dec. 1, 1931

1,834,777

UNITED STATES PATENT OFFICE

LLEWELLYN C. HARDESTY, OF SCOTIA, NEW YORK, ASSIGNOR TO GENERAL ELECTRIC COMPANY, A CORPORATION OF NEW YORK

MOTOR CONTROL

Application filed August 5, 1927. Serial No. 210,978.

My invention relates to improvements in motor control, and in particular to improvements in systems of motor control whereby the extent of the independent operation of one motor driven element may be limited with reference to another element which is independently operated by another motor.

A particular application of the invention is found in electric drives for bucket hoists. In such drives, it is customary to provide two motors which may be independently operated. One of these motors is connected through a cable to the frame of the bucket and is commonly called the "shell motor" or "holding line motor". This motor is provided for raising and for governing the lowering of the bucket. The other motor is connected through a cable to the opening and closing mechanism of the bucket. This second motor is ordinarily called the "closing line" motor. In general routine work, the closing line motor closes the jaws of the bucket when the bucket has been lowered to the material to be raised. The jaws of the bucket close and cause a load of material to be retained in the bucket. The bucket is then raised by both motors being energized to operate as motors and apply a hoisting effect. When the bucket has been moved to the desired position, the load of material is dumped by reversing the closing line motor while the bucket is held in position, thereby permitting the jaws of the bucket to open. The empty bucket is then lowered with the jaws open and the above described operation is then repeated.

If one motor is operated so as to operate its associated drum faster than the other motor is operated so as to operate its associated drum, or if one motor is stopped and the other is operated, under certain conditions an excessive amount of cable is likely to be unwound from the drum that is being operated. If the holding line motor is not being operated and the closing line motor is operated in the lowering direction so as to unwind cable from the closing line drum and effect the opening of the jaws of the bucket, if the closing line motor is operated after the jaws of the bucket are opened, an excessive amount of cable is unwound from the closing line drum. If the closing line motor is operated so as to wind up cable on the closing line drum and close the jaws of the bucket, when the bucket jaws are closed, if the holding line motor is operated so as to unwind cable from the holding line drum while the bucket is being held by the closing line, an excessive amount of cable will be unwound from the holding line and the slack in this cable is undesirable.

An object of the invention is to prevent the formation of an excessive amount of slack in either the closing line or the holding line. In carrying my invention into effect in the form which I now regard as the preferred form thereof, I provide a motor control including as a part thereof, a limit switch mechanism which has cooperating parts each of which is movable in response to the rotation of its respective associated drum. Thus, when the phase angle displacement of one drum with reference to another drum is greater than a predetermined value, the respective motors operating the drums are so controlled that the formation of slack in the cables is prevented.

For a better understanding of the invention, reference is had to the accompanying drawing, in which I have illustrated in very simple diagrammatic form, a motor control for a grab bucket hoist having a limit switch incorporated in the control for the purpose specified. The bucket 10 is indicated as of the grab or "shell" type. The jaws of this bucket are opened and closed under the control of the closing line 11, which has one end thereof secured to the closing line drum 12. This drum is operated by the electric motor 13 which is indicated as of the direct current shunt wound type. I would have it understood that the invention is not necessarily limited to this particular type of motor, since other types of motors may be employed for the operation of the drums and such other types of motors may be also controlled in accordance with the features of the invention, as will be understood from the following explanation. The motor 13 is arranged to be connected to the source of supply 14 under the control of the directional contactors 15 and 16 which are governed by the manually operated reversing controller 17. The contactor 15 is provided for effecting the energization of the motor 13 for closing the jaws of the bucket 10 and for raising this bucket and the contactor 16 is provided for effecting the energization of motor 13 to open the jaws of the bucket and govern the lowering of the bucket.

The bucket 10 is raised and lowered by means of the holding line 18 which has one end thereof connected to the bucket and the other end thereof connected to the holding line drum 19. The drum 19 is operated by means of the motor 20, which is also indicated as of the direct current shunt wound type, although the invention is not necessarily limited to this type of motor, as was explained previously. The motor 20 is connected to the direct current source of supply 14 under the control of the directional contactors 21 and 22 which are governed by means of the manually operated master switch 23. The directional contactor 21 is provided for effecting the energization of motor 20 to hoist the bucket 10 and the directional contactor 22 is provided for effecting the connection of motor 20 to source 14 for governing the lowering of bucket 10.

I have merely shown a simplified control for the motors 13 and 20, as previously explained. However, I would have it understood that these bucket hoist controls are sometimes quite complicated and incorporate features such as dynamic braking of the motors to govern the lowering of the bucket and various other features. I have not shown such features, since they are not of the essence of the present invention and it is believed that the invention will be better understood by reason of the elimination of those features and from the further fact that those skilled in the art will readily supply such further features as the necessities of the particular case require.

In order to prevent either motor from operating its associated drum in such a manner and to such an extent that the formation of slack in the cable associated with the other drum either occurs or is likely to occur, I have provided the differential limit switch 24. This switch is provided with two cooperating parts, each of which is connected to an associated drum so as to be operated in synchronism therewith. One of these parts comprises the conducting rings 25, 26 and 27, together with the brush holder 28 and the brushes 29, 30 and 31. This limit switch part is operated in accordance with the operation of the drum 19 by being connected to said drum in any suitable manner, as for instance by means of the belt 32, which is shown. The other controller part comprises the drum controller having the conducting ring 33, and electrically interconnected conducting segments 34 and 35, which are operated synchronously with the drum 12 by means of a connection between the drum 12 and this controller part which is similar to that used in connection with the drum 19 and the controller part operated synchronously therewith.

As thus constructed and arranged and with the respective parts in their positions as indicated in the drawing, the operation of my invention is as follows: In order to close the jaws of the bucket 10 and effect the raising of the bucket, the controller 17 will be thrown toward the left so as to effect the energization of the directional contactor 15. This will cause the motor 13 to be energized in such a direction that the drum 12 will be rotated to wind up the closing line 11. As the drum 12 is rotated, the part of the limit switch mechanism 24 which includes the ring 33, and segments 34 and 35 will be rotated in such a direction that after a predetermined extent of movement of the drum 12, the brush 30 will be moved out of engagement with the segment 34. This will be brought about when the jaws of the bucket are fully closed. It will be observed that the energizing circuit for the winding of contactor 15 is from the lower conductor of source 14, the right-hand contacts of master switch 17, winding of contactor 15, conducting ring 26, brush 30, conducting segment 34 and ring 33, ring 27, to the upper supply conductor. As the motor 13 operates to close the jaws of the bucket, assuming that the motor 20 is not being operated, the segment 34 of the limit switch arrangement will be moved so that the brush 30 is out of engagement therewith. This will interrupt the energizing circuit for the contactor 15 and the motor 13 will be stopped.

It will also be observed that the lowering contactor 22 for the motor 20 cannot be energized because of the fact that the circuit for the winding of contactor 22 is traced through the segment 34 and brush 30 of the limit switch 24. As a consequence, the motor 13 is stopped when the jaws of the bucket are fully closed and the bucket jaws will be held in this closed position by any suitable means, such as the common and well known series electro-magnet brake which when deenergized applies a frictional braking effect to hold a driven device. Because of the fact that the contactor 22 cannot be energized, the operation of the motor 20 in the lowering direction is prevented. This is desirable, since if it were possible to operate the motor 20 in the lowering direction, the holding line would be unwound from the drum 19 to such an extent that there would be an undesirable slack in this line. The motor 20 may nevertheless be operated in the hoisting direction by throwing the master switch 23 to the left, thereby energizing the directional contactor 21 from the lower conductor of source 14, right-hand contacts of master switch 23, coil of contactor 21, conducting ring 25 of limit switch 24, brush 31, segment 35, ring 33, brush 29, and ring 27 of the limit switch to the upper conductor of source 14.

It is desirable that both motors 13 and 20 be operated when the bucket is to be raised. Both motors are thus effective to provide a hoisting action and further the jaws of the bucket are prevented from opening. In order to insure this, the limit switch 24 provides a control whereby if the motor 20 is operated to such an extent that the drum 19 has wound up a predetermined length of cable while the drum 12 remains stationary, the contactor 21 will be automatically opened. Thus, when the drum 19 is operated to wind cable thereon, the brush holder 28 and the associated brushes 29, 30 and 31 will be rotated synchronously with the drum 19. After a predetermined extent of movement, the brush 31 will break engagement with the segment 35 and thereby interrupt the energizing circuit for contactor 21, thus stopping the motor 20 from further operation in the hoisting direction. However, if when the jaws of the bucket are closed, both motors 13 and 20 are simultaneously operated, the phase angular displacement between the two relatively movable cooperating parts of the limit switch 24 will be such that the bucket may be raised and lowered at the will of the operator.

Assume that the bucket has been raised and it is desired to open the same. The master switch 17 will be thrown to the right so that a circuit is made from the lower conductor of source 14, coil of contactor 16, conducting ring 25, brush 31, segment 35, conducting ring 33, brush 29, conducting ring 27 to the upper conductor of the source 14. This will effect the closing of contactor 16 and the motor 13 will be energized so as to unwind the cable from the drum 12. This will effect the opening of the jaws of the bucket so that the material in the bucket may be spilled therefrom. During this unloading operation, it has been assumed that the bucket is being held by the holding line 18, it being assumed that the drum 19 will be frictionally held in its operated position when the motor 20 is deenergized. Electromagnetically released friction brakes are commonly provided for thus holding the drum and I contemplate the provision of such holding devices for both the drums 12 and 19. When the predetermined length of cable has been unwound from drum 12, the segment 35 will break engagement with brush 31 and stop the unwinding operation of drum 12. It will also be observed that when the jaws of the bucket are thus opened, the motor 20 cannot be energized so as to effect further raising of the bucket, because of the fact that the circuit for the directional contactor 21 is also opened at the same time that the circuit for the winding of contactor 16 is opened. This will prevent the formation of slack in the holding cable 18, since the motor 20 cannot be energized so as to effect the lowering of the bucket until the cooperating parts of the limit switch 24 have been returned to practically the phase angle relation which is indicated in the drawing.

It will be observed from the foregoing that while a control in accordance with my invention gives the operator of the hoist full control over the ordinary manipulation of the bucket through his operation of the master switches 17 and 23, nevertheless, in case he attempts to operate the equipment in such a manner that slack cable will be formed in either the holding line or the closing line, the functioning of the limit switch 24 will automatically prevent this being done. It will also be observed that the control is such that the limit switch does not shut down the equipment, but merely necessitates that the operator operate the equipment in such a manner that he will not form slack cable in either one of the cables. Those familiar with bucket hoists, for example, will readily appreciate the advantages of such control.

What I claim as new and desire to secure by Letters Patent of the United States is:—

1. In a motor control, two separately operable motors, separately operable elements connected to be operated by said motors, and means automatically operated in dependence on the occurrence of a predetermined phase difference in said elements for insuring limited independent operation of both of said motors in both directions of rotation.

2. In a motor control, two separately operable motors, separately operable elements connected to be operated by said motors, independently operable starting and reversing controlling means for each of said motors, and electrical connections between said controlling means including limit switch mechanism having cooperating parts connected to the respective elements to have relative movement in response to relative movement of the elements to effect the automatic stopping of the motor being operated and the prevention of the starting of the other of said motors to increase the phase angle displacement of the elements.

3. In a bucket hoist, a holding drum and a cable connected thereto for governing the hoisting and the lowering of the bucket, an independently operable closing drum and a cable connected thereto for governing the opening and the closing of the bucket, a separate independently operable motor for each of said drums, and means automatically operated in dependence on the occurrence of a predetermined phase difference of said drums for limiting the extent of the independent operation of said motors in both directions of rotation to prevent formation of slack in said cables.

4. In a bucket hoist, a holding drum and a holding line connected thereto for governing the raising and the lowering of the bucket a closing drum and a closing line connected thereto for governing the closing and the opening of the bucket, a separate independently operable electric motor for each of said drums, and controlling means for each of said motors including limit switch mechanism having cooperating parts which are connected to the respective drums to have relative movement in response to relative movement of the drums for limiting the extent of the independent operation of said motors in both directions of rotation to prevent formation of slack in said cables.

5. In a bucket hoist, a holding drum and a cable connected thereto for governing the hoisting and the lowering of the bucket, an independently operable closing drum and a cable connected thereto for governing the opening and the closing of the bucket, a separate independently operable motor for each of said drums, independently operable starting and reversing controlling means for each of said motors, and electrical connections between said controlling means including limit switch mechanism having cooperating parts which are connected to the respective drums to have relative movement in response to relative movement of the drums to effect the automatic stopping of the motor being operated and the prevention of the starting of the other of said motors in such a direction as to form slack in said cables.

6. In a motor control, two separately operable motors, separately operable elements connected to be operated by said motors and means automatically operated in dependence on the occurrence of a predetermined phase difference in said elements by the operation of either one of said motors for limiting the extent of the independent operation of said motors in either direction of rotation.

7. In a motor control, two separately operable motors, independently operable controlling means for each of said motors whereby each motor may be operated in a forward or a reverse direction and means operable in response to the operation of one of said motors in either direction for limiting the independent operation thereof in either direction of rotation and for preventing the operation of the other of said motors in a direction opposite to that of the first mentioned motor.

8. In a motor control, two separately operable motors, separately operable elements connected to be operated by said motors, independently operable starting and reversing controlling means for each of said motors and connections between said controlling means including limit switch mechanism having cooperating parts connected to the respective elements so as to have relative movement in response to relative movement of said elements to thereby effect the automatic stopping of the motor being operated in either direction of rotation and the prevention of the starting of the other of said motors in the opposite direction while permitting the latter motor to start in the same direction of rotation as that of the first mentioned motor.

In witness whereof, I have hereunto set my hand this 3d day of August, 1927.

LLEWELLYN C. HARDESTY.